July 2, 1929.  J. S. OGSBURY  1,719,077

COMPUTING SCALE

Filed Sept. 30, 1925

Inventor
James S. Ogsbury
By his Attorneys
Cooper, Kerr & Dunham

Patented July 2, 1929.

1,719,077

UNITED STATES PATENT OFFICE.

JAMES S. OGSBURY, OF TORONTO, ONTARIO, CANADA, ASSIGNOR TO DAYTON SCALE COMPANY, OF DAYTON, OHIO, A CORPORATION OF NEW JERSEY.

COMPUTING SCALE.

Application filed September 30, 1925. Serial No. 59,705.

This invention pertains to weighing scales, more particularly scales of the automatic computing type.

These scales generally have a chart comprising parallel, closely adjacent columns or rows of figures. Each column is associated with a particular number representing a price per pound or other unit of weight, and the figures in each column are the money values of different weights of goods calculated at the price corresponding to that column or row of values.

In some types of these scales the chart is stationary and an index actuated by the lever system of the scale moves relatively to the chart. In other types of computing scales the price chart, or price "range" as it is known in the trade, is stationary and the value chart actuated by the lever system moves relatively to the price range.

In using either type of scale the operator after placing the goods on the scale platform and waiting for the movable scale parts to come to rest, in order to learn the value of the goods, must first find on the price range the price per pound of the goods and then, with his eye, follow along the column or row of computed values and read the particular value printed out by the indicator.

The indicator is generally a wire extending across all the value columns or rows, and is generally in fixed relationship to the price range. If the price range is stationary the indicator is also stationary, while if the price range is movable the indicator generally moves with it.

In any case, in determining a value, the operator must first select the proper price on the price range and then follow the corresponding value column or row until the correct value will be found where the indicator wire crosses that particular column.

The columns or rows of values are closely packed with figures, especially those columns corresponding to high prices, and every column is closely similar to the adjacent columns on both sides of it, so it happens that the gaze of the operator in moving from price range to indicator sometimes wanders from the proper column into an adjacent column, and an incorrect value is read.

This is particularly true in recent years because of the practice of placing more prices in the price range thereby making the value columns not only more numerous but narrower and therefore more difficult to read.

This invention provides means for making each price on the price range and each column of values stand out distinctly from its neighbor on each side, thereby enabling the operator to confine his gaze to the particular price and column desired, thus eliminating possibility of error.

Another object of my invention is to relieve the strain on the eyes of the operator which may become very trying when using the scale constantly.

I am for purposes of illustration showing my invention in connection with a drum type of computing scale, but as stated above, it may be used with other types of scales and the invention extends to such use.

Figure 2:
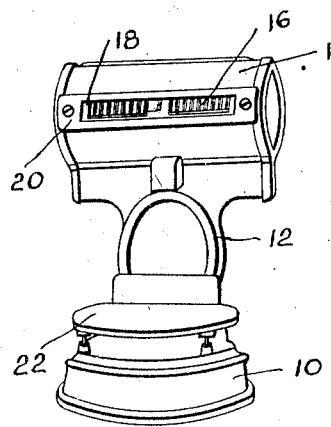
Fig. 2 is a perspective view of a drum computing scale of a well known type.

In Fig. 2, 10 is the base frame of the scale containing the lever system, 12 is the vertical housing containing some of the automatic load offsetting devices, while 14 is the outer shell in which is mounted for rotation the drum chart 16 which may be seen through the opening 18 in the guard 20.

When the goods to be weighed are placed on platform 22, the lever system and load offsetting devices are displaced an amount proportionate to the weight of the goods, with the result that the drum chart 16, connected to the lever system, is rotated and comes to rest at a new position which indicates the weight of the goods and the value thereof at any price on the price range.

Figure 1:
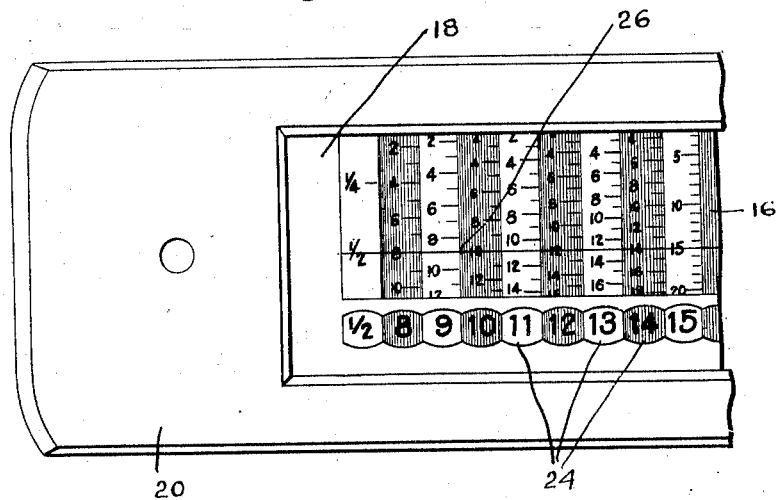
Fig. 1 shows an enlarged detail view of a portion of the chart, price range and indicator.

That portion of the chart which indicates weights is not illustrated, but a portion of the chart showing values is illustrated in Fig. 1, in which 24 is the price range and 26 the indicator, both being fixed in position. The chart 16 moves relatively to indicator and price range and is shown in the position it assumes when a one pound load is on platform 22.

To learn the value of the load on the platform at any price the operator locates that price on the price range and then runs his eye up the value column to the indicator where will be found the computed value of that particular load of goods at that particular price per pound. The ½ cent price is generally used to aid in arriving at the value of goods having fractional prices per unit. For instance, if the price is 12½ cents the total value is arrived at by reading the values in the 12 cent and ½ cent columns and adding them.

My invention consists in printing the price range and chart in two or more colors, so that every figure on the price range and every value column on the chart is of a different color from its neighbor on each side of it. Preferably, each value column is the same color as its corresponding price. It is not necessary that the figures themselves be of different colors, any color device being used which will convey to the eye of the operator the effect that each value column and its price are of the same color, and that both are different from the immediately adjacent prices and value columns on both sides.

This construction greatly aids the operator in confining his gaze to the proper column and also relieves the strain on his eyes by rendering unnecessary the close study of price, indicator and chart required by computing scales of the usual construction.

What I claim is—

In a weighing scale, in combination, a chart bearing a plurality of columns of value designations, each column having a different physical characteristic than the adjacent columns to readily distinguish it from said adjacent columns, and a unit price range adjacent said columns, each unit price indication having a physical characteristic similar to that of its corresponding value column.

In testimony whereof I hereto affix my signature.

JAMES S. OGSBURY.